US012385680B2

(12) United States Patent
Micallef

(10) Patent No.: US 12,385,680 B2
(45) Date of Patent: Aug. 12, 2025

(54) SYSTEMS AND/OR METHODS FOR CONTROLLING A COMPRESSOR AND/OR A FAN MOTOR

(71) Applicant: Falkonair, Inc., Wellington, FL (US)

(72) Inventor: Christopher Micallef, Staffordshire (GB)

(73) Assignee: FALKONAIR, INC., Wellington, FL (US)

( * ) Notice: Subject to any disclaimer, the term of this patent is extended or adjusted under 35 U.S.C. 154(b) by 0 days.

(21) Appl. No.: 17/234,850

(22) Filed: Apr. 20, 2021

(65) Prior Publication Data
US 2021/0333031 A1 Oct. 28, 2021

Related U.S. Application Data

(60) Provisional application No. 63/014,885, filed on Apr. 24, 2020.

(51) Int. Cl.
*F25B 49/02* (2006.01)
*F25B 1/00* (2006.01)

(52) U.S. Cl.
CPC .............. *F25B 49/022* (2013.01); *F25B 1/00* (2013.01); *F25B 2400/075* (2013.01);
(Continued)

(58) Field of Classification Search
CPC .............. F25B 49/022; F25B 2400/075; F25B 2600/01; F25B 2600/021; F25B 2600/025;
(Continued)

(56) References Cited

U.S. PATENT DOCUMENTS 2,200,477 A    5/1940 Newton
2,489,009 A    11/1949 Corhanidis
(Continued)

FOREIGN PATENT DOCUMENTS

DE    3118674 A1    1/1982

OTHER PUBLICATIONS

International Search Report dated Jul. 21, 2021 for PCT/US21/28539.
(Continued)

*Primary Examiner* — Jonathan Bradford
(74) *Attorney, Agent, or Firm* — Nixon & Vanderhye P.C.

(57) ABSTRACT

Certain example embodiments provide a vapor compression refrigeration system, comprising: a compressor configured to suction refrigerant at a low pressure and temperature from a suction return, compress the refrigerant, and output refrigerant at a higher pressure and temperature; a condenser configured to cool refrigerant received from the compressor as the refrigerant passes though coils in the condenser; an expansion device configured to reduce the pressure of the refrigerant received from the condenser; and an evaporator configured to allow the refrigerant received from the expansion device to absorb heat surrounding the evaporator. The system may include a plurality of sensors configured to measure temperature of the system and a controller configured to control, based on the signals from one or more sensors, operation of the compressor and/or an evaporator fan motor configured to allow the refrigerant received from the expansion device to absorb heat surrounding the evaporator.

13 Claims, 7 Drawing Sheets

(52) U.S. Cl.
CPC ..... *F25B 2600/01* (2013.01); *F25B 2600/021* (2013.01); *F25B 2600/025* (2013.01); *F25B 2600/0253* (2013.01); *F25B 2600/112* (2013.01); *F25B 2700/21151* (2013.01); *F25B 2700/21152* (2013.01); *F25B 2700/21163* (2013.01); *F25B 2700/2117* (2013.01); *F25B 2700/21172* (2013.01); *Y02B 30/70* (2013.01)

(58) Field of Classification Search
CPC .... F25B 2600/0253; F25B 2700/21151; F25B 2700/21152; F25B 2700/2117; F25B 2700/21172
See application file for complete search history.

(56) References Cited

U.S. PATENT DOCUMENTS

| | | | |
|---|---|---|---|
| 2,964,922 | A | 12/1960 | Canter |
| 3,695,054 | A | 10/1972 | Barry |
| 4,092,573 | A | 5/1978 | D'Entremont |
| 4,425,572 | A | 1/1984 | Shark |
| 4,878,355 | A | 11/1989 | Beckey et al. |
| 5,054,294 | A * | 10/1991 | Dudley .............. G05D 23/1912 62/158 |
| 5,067,326 | A | 11/1991 | Alsenz |
| 5,144,812 | A | 9/1992 | Mills, Jr. et al. |
| 6,467,696 | B2 | 10/2002 | Riley et al. |
| 6,516,622 | B1 * | 2/2003 | Wilson .................... F04C 28/08 62/228.3 |
| 7,290,398 | B2 * | 11/2007 | Wallace .................... F25B 5/02 62/157 |
| 7,617,695 | B2 | 11/2009 | Shapiro |
| 9,476,625 | B2 | 10/2016 | McSweeney |
| 2006/0288714 | A1 | 12/2006 | Joyner |
| 2008/0264080 | A1 * | 10/2008 | Creed ................... F25B 49/025 236/92 R |
| 2011/0018472 | A1 | 1/2011 | Rockenfeller et al. |
| 2011/0110791 | A1 * | 5/2011 | Donnat ................. F25B 49/022 417/18 |
| 2012/0010753 | A1 | 1/2012 | Schuster et al. |
| 2013/0282183 | A1 | 10/2013 | Miller et al. |
| 2016/0327323 | A1 * | 11/2016 | Goel ..................... F25B 49/022 |

OTHER PUBLICATIONS

Extended European Search Report for European Application No. 21791689.9 dated Aug. 16, 2024.
Anonymous: "Bedienungs—Und Instandhaltunghandbuch für 69NT40-561-200 bis 299", Sep. 1, 2016 (Sep. 1, 2016), pp. 1-158, XP093192571, Retrieved from the Internet: URL:https://www.ravagroupcontainers.com/wp-content/uploads/2021/05/T-362G- PrimeLINE—Units.—Operation-Service-Manual.—Models—60 NT40-561-200-to-299-German.pdf *pp. 27-28*.
European Supplementary Partial European Search Report for European Application No. 21791689.9 dated Mar. 26, 2024.

* cited by examiner

SYSTEMS AND/OR METHODS FOR CONTROLLING A COMPRESSOR AND/OR A FAN MOTOR

CROSS-REFERENCE TO RELATED APPLICATION

This application is based on and claims priority to Provisional Application No. 63/014,885, filed on Apr. 24, 2020, in the United States Patent and Trademark Office, the disclosure of which is incorporated by reference herein in its entirety.

TECHNICAL FIELD

Certain example embodiments described herein relate to techniques for controlling a compressor and a fan motor. More particularly, certain example embodiments described herein relate to systems and/or methods for controlling operation of one or more compressors and/or one or more evaporator fan motors based on signals received from one or more sensors disposed in vapor-compression refrigeration system.

BACKGROUND

Vapor-compression refrigeration systems are one or the most widely used method for cooling buildings, automobiles, domestic and commercial refrigerators, large-scale warehouses for chilled or frozen storage of foods and meats, refrigerated trucks, refrigerated railroad cars, and a host of other commercial and industrial applications. Cooling or refrigeration includes lowering the temperature of an enclosed space by removing heat from that space and transferring it to another space. Devices performing these functions may also be called an air conditioner, refrigerator or heat pump.

Vapor-compression systems circulate liquid refrigerant which absorbs and removes heat from a space to be cooled and releases the absorbed heat in another space. A vapor-compression systems includes four main components: a compressor, a condenser, an expansion valve and an evaporator. The compressor receives refrigerant at a low pressure and temperature and compresses the refrigerant, providing the refrigerant at higher pressure and temperature. The compressed refrigerant is provided to a condenser to be cooled, for example with water or air flow across coils. In the condenser, the heat is rejected from the system by the cooling. The condensed refrigerant is routed via an expansion valve where the refrigerant undergoes a reduction in pressure, which lowers the temperature of the refrigerant. The cooled refrigerant is routed through coils of an evaporator, where a fan can be used to circulate warm air of enclosure to be cooled across the coils in the evaporator. As the air of the enclosure is cooled, the refrigerant in the evaporator absorbs and removes heat from the enclosure. The refrigerant from the evaporator is returned to the compressor to continue the refrigeration cycle.

To improve efficiencies of vapor-compression systems, new refrigerants are being introduced. To reduce energy consumption, some systems are used with programmable or smart thermostats to reduce operating time of the overall systems or to more precisely set the desired temperature at specific time. However, the programmable or smart thermostats still operate using simple on and off controls based on set and measured room temperature.

Systems and method are needed to further improve operating efficiency of vapor-compression systems, extend the life of components in the system, and/or improve reliability.

SUMMARY

Certain example embodiments of the present technology help address the above-described and/or other concerns by providing a smart control system for controlling operation of various components of a system based on sensed parameter of the system. For example, certain example embodiments help improve efficiency e.g., by reducing operating times of one or more compressors and/or operating power of one or more evaporator fan motors.

Certain example embodiments provide a vapor compression refrigeration system, comprising a compressor, a condenser, an expansion device, and an evaporator. The compressor may be configured to suction refrigerant at a low pressure and temperature from a suction return, compress the refrigerant, and output refrigerant at a higher pressure and temperature. The condenser may be configured to cool refrigerant received from the compressor as the refrigerant passes though coils in the condenser. The expansion device may be configured to reduce the pressure of the refrigerant received from the condenser. The evaporator may be configured to allow the refrigerant received from the expansion device to absorb heat surrounding the evaporator. The system may include a plurality of sensors configured to measure temperature of the system and a controller configured to control, based on the signals from one or more sensors, operation of the compressor and/or an evaporator fan motor configured to allow the refrigerant received from the expansion device to absorb heat surrounding the evaporator.

According to one exemplary embodiment, a vapor compression refrigeration system, comprising: a compressor configured to suction refrigerant at a low pressure and temperature from a suction return, compress the refrigerant, and output refrigerant at a higher pressure and temperature; a condenser configured to cool refrigerant received from the compressor as the refrigerant passes though coils in the condenser; an expansion device configured to reduce the pressure of the refrigerant received from the condenser; an evaporator configured to allow the refrigerant received from the expansion device to absorb heat surrounding the evaporator; a first sensor configured to measure refrigerant discharge temperature between the compressor and the condenser; a second sensor configured to measure refrigerant temperature on the suction return; and a controller including circuitry coupled to the first sensor, the second sensor and the compressor. The controller configured to: receive a first signal corresponding to the refrigerant discharge temperature from the first sensor; receive a second signal corresponding to the refrigerant temperature on the suction return to the compressor from the second sensor; control the compressor to turn off based on the first signal; and control the compressor to reduce frequency speed of the compressor based on the second signal.

In another exemplary embodiment, (a) the compressor is controlled to turn off when the refrigerant discharge temperature is above a set point; (b) the compressor is controlled to reduce the frequency speed of the compressor when the refrigerant temperature on the suction return is determined to approach the set point; (c) the system further comprises a first slave compressor and wherein the controller is further configured to: start a countdown set to a predetermined time period when the compressor is turned on; and control the first slave compressor to turn on based on the refrigerant temperature on the suction return not decreasing during the countdown; (d) the system further comprises a second slave compressor and wherein the controller is further configured to: start a second countdown set to the predetermined time period when the first slave compressor is turned on; and control the second slave compressor to turn on based on the refrigerant temperature on the suction return not decreasing during the second countdown; (e) the controller is configured to control the compressor to start modulation when the first slave compressor and/or the second slave compressor are started; (f) the compressor is a variable speed compressor and the first and second slave compressors are fixed speed compressors; (g) the compressor is a variable speed compressor and the controller is configured to control the compressor via an inverter driver; (h) the system further comprises a third sensor configured to provide signals corresponding to return air temperature, a first slave compressor, and a second slave compressor, wherein the controller is further configured to: control the first slave compressor and the second slave compressor based on signals provided by the third sensor; and/or (i) the system further comprising a third sensor configured to provide signals corresponding to return air temperature, a first slave compressor, and a second slave compressor, wherein the controller is further configured to: start a first countdown set to a predetermined time period when the compressor is turned on; control the first slave compressor to turn on based on the refrigerant temperature on the suction return not decreasing during the countdown and based on the return air temperature; start a second countdown set to the predetermined time period when the first slave compressor is turned on; and control the second slave compressor to turn on based on the refrigerant temperature on the suction return not decreasing during the second countdown and based on the return air temperature.

In another exemplary embodiment, a vapor compression refrigeration system, comprising: a compressor configured to suction refrigerant at a low pressure and temperature from a suction return, compress the refrigerant, and output refrigerant at a higher pressure and temperature; a condenser configured to cool refrigerant received from the compressor as the refrigerant passes though coils in the condenser; an expansion device configured to reduce the pressure of the refrigerant received from the condenser; an evaporator configured to allow the refrigerant received from the expansion device to absorb heat surrounding the evaporator; an evaporator fan motor configured to provide air flow across coils in the condenser; a first sensor configured to measure a temperature of the evaporator fan motor windings; a second sensor configured to measures a temperature on an air supply coming from the evaporator; and a controller including circuitry coupled to the first sensor, the second sensor and the evaporator fan motor. The controller configured to: receive a first signal corresponding to the temperature of the evaporator fan motor windings from the first sensor; receive a second signal corresponding to the temperature on an air supply from the second sensor; control the evaporator fan motor to turn off based on the first signal indicating that the temperature of the evaporator fan motor windings is above a set point; and control the evaporator fan motor to increase operating speed based on the temperature on the air supply approaching the set point.

In another exemplary embodiment, (a) the compressor is controlled to turn on based on a signal received from a thermostat; (b) the evaporator fan motor is a variable speed fan motor and the controller is configured to control the evaporator fan motor via an inverter driver; (c) the system further comprises a third sensor configured to provide signals corresponding to refrigerant temperature on the suction return to the compressor and a first slave evaporator fan motor, wherein the controller is further configured to control the first slave evaporator fan motor based on the signal received from the third sensor; (d) the system further comprises a third sensor configured to provide signals corresponding to refrigerant temperature on the suction return to the compressor and a first slave evaporator fan motor, wherein the controller is further configured to: start a countdown set to a predetermined time period when the evaporator fan motor is turned on; and control the first slave evaporator fan motor to turn on based on the refrigerant temperature on the suction return not decreasing during the countdown; (e) the evaporator fan motor is a variable speed fan motor and the controller is configured to control the evaporator fan motor via an inverter driver, and the inverter driver is controlled to modulate the evaporator fan motor when the refrigerant temperature on the suction return approaches the set point; (f) the system further comprises a second slave evaporator fan motor and wherein the controller is further configured to: start a second countdown set to the predetermined time period when the first slave evaporator fan motor is turned on; and control the second slave evaporator fan motor to turn on based on the refrigerant temperature on the suction return not decreasing during the second countdown; (g) the controller is configured to control the evaporator fan motor to start modulation when the first slave evaporator fan motor and the second slave evaporator fan motor are started; (h) the controller is further coupled to the compressor and the controller is further configured to: receive a third signal corresponding to a refrigerant discharge temperature of the compressor; control the compressor to turn off based on the third signal; and control the compressor to reduce frequency speed of the compressor based on the refrigerant temperature on the suction return; and/or (i) the system further comprises a first slave compressor and a second slave compressor, wherein the controller is further configured to: start a third countdown set to a predetermined time period when the compressor is turned on; control the first slave compressor to turn on based on the refrigerant temperature on the suction return not decreasing during the third countdown; start a fourth countdown set to the predetermined time period when the first slave compressor is turned on; and control the second slave compressor to turn on based on the refrigerant temperature on the suction return not decreasing during the second countdown.

In another exemplary embodiment, a method for controlling a vapor compression refrigeration system comprising: a compressor configured to suction refrigerant at a low pressure and temperature from a suction return, compress the refrigerant, and output refrigerant at a higher pressure and temperature; a condenser configured to cool refrigerant received from the compressor as the refrigerant passes though coils in the condenser; an expansion device configured to reduce the pressure of the refrigerant received from the condenser; an evaporator configured to allow the refrigerant received from the expansion device to absorb heat surrounding the evaporator; a first sensor configured to measure refrigerant discharge temperature between the compressor and the condenser; and a second sensor configured to measure refrigerant temperature on the suction return; the method comprising: receiving a first signal corresponding to the refrigerant discharge temperature from the first sensor; receiving a second signal corresponding to the refrigerant temperature on the suction return to the compressor from the second sensor; controlling the compressor to turn off based on the first signal; and controlling the compressor to reduce frequency speed of the compressor based on the second signal.

In another exemplary embodiment, a method for controlling vapor compression refrigeration system comprising: a compressor configured to suction refrigerant at a low pressure and temperature from a suction return, compress the refrigerant, and output refrigerant at a higher pressure and temperature; a condenser configured to cool refrigerant received from the compressor as the refrigerant passes though coils in the condenser; an expansion device configured to reduce the pressure of the refrigerant received from the condenser; an evaporator configured to allow the refrigerant received from the expansion device to absorb heat surrounding the evaporator; an evaporator fan motor configured to provide air flow across coils in the condenser; a first sensor configured to measure a temperature of the evaporator fan motor windings; a second sensor configured to measures a temperature on an air supply coming from the evaporator; the method comprising: receiving a first signal corresponding to the temperature of the evaporator fan motor windings from the first sensor; receiving a second signal corresponding to the temperature on an air supply from the second sensor; controlling the evaporator fan motor to turn off based on the first signal indicating that the temperature of the evaporator fan motor windings is above a set point; and controlling the evaporator fan motor to increase operating speed based on the temperature on the air supply approaching the set point.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments relate to a smart control system for controlling operation of components in a vapor-compression system. In certain example embodiments, a controller is configured to control operation of a variable speed compressor and/or a variable speed fan motor based on signals received from one or more sensors disposed in the vapor-compression system. Certain example embodiments address issues with low operating efficiency of conventional systems, and/or extending life of the system components. For example, certain example embodiments help improve efficiency and/or life of the component e.g., by reducing operating times of one or more compressors and/or operating power of one or more fan motors.

Details concerning example implementations are provided below. It will be appreciated that these example implementations are provided to help demonstrate concepts of certain example embodiments, and aspects thereof are non-limiting in nature unless specifically claimed. For instance, certain examples of cooling systems and/or control systems are provided below to ease understanding of the example embodiments described herein and are not limiting unless explicitly claimed.

Figure 1:
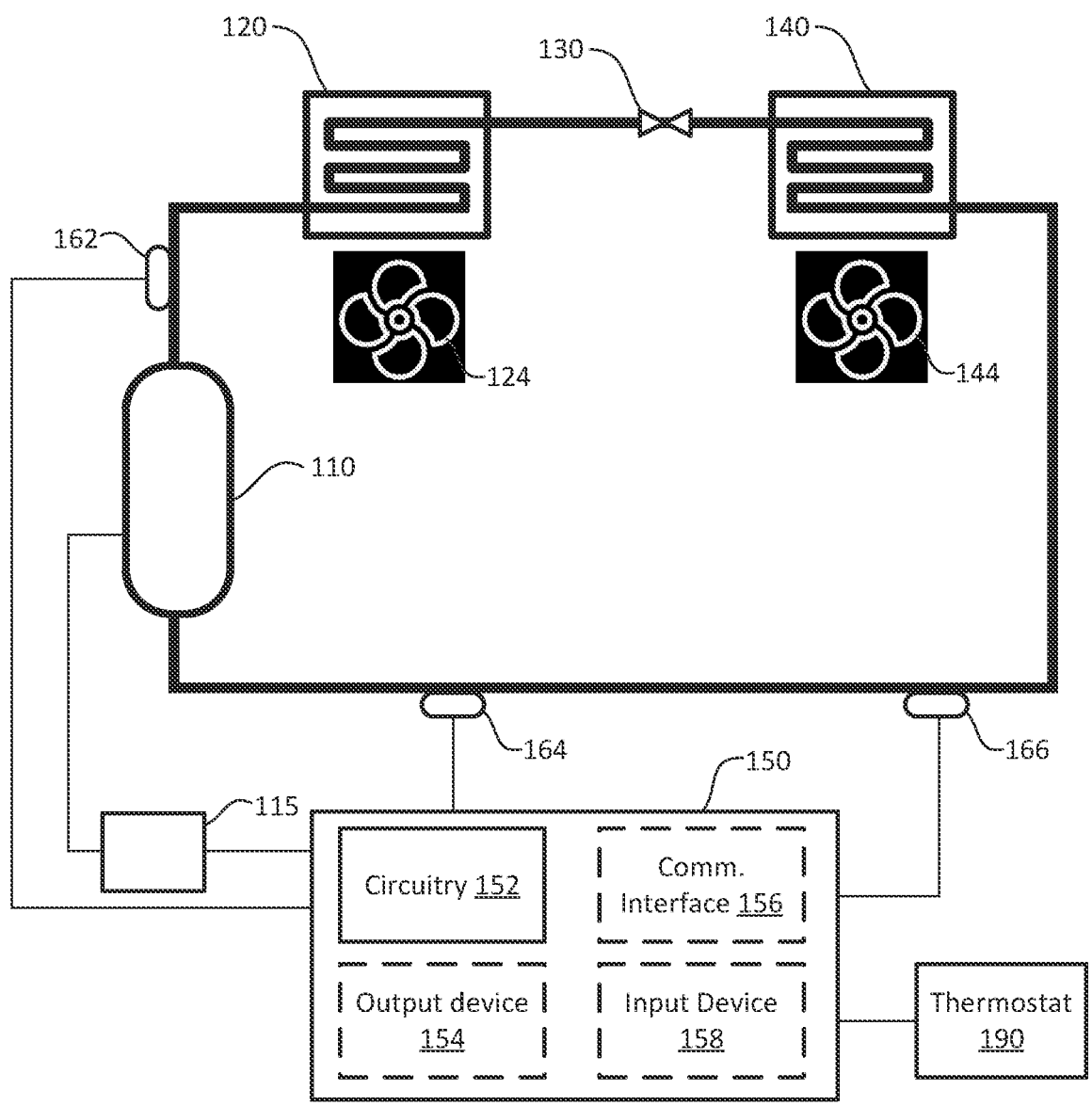
FIG. 1 illustrates a vapor-compression system according to an embodiment of the present technology.

FIG. 1 illustrates a vapor-compression system according to an embodiment of the present technology. The system includes a compressor 110, a condenser 120, an expansion device 130 and an evaporator 140. While a single components are shown in FIG. 1, the example embodiments of this disclosure are not so limited and may include one or more additional similar component provided in series and/or parallel to the illustrated components.

The compressor 110 plays a key role in the refrigeration circuit and is one of the four main components. The compressor 110 receives refrigerant at a low pressure and temperature, compresses the refrigerant, and outputs refrigerant at a higher pressure and temperature. The compressed refrigerant is provided to the condenser 120 for cooling as the refrigerant is passed though coils in the condenser 120. The condenser 120, which may be a condenser heat exchanger, may be disposed adjacent to a condenser fan motor 124 configured to provide air flow across coils in the condenser 120. In some embodiments other methods such as passing water over the coils may be used to cool the refrigerant.

The expansion device 130, which may be a metering device known as the expansion valve, is configured to reduce the pressure of the refrigerant, which lowers the temperature of the refrigerant. As shown in FIG. 1, the expansion device 130 is disposed between the condenser 120 and the evaporator 140.

The evaporator 140 is configured to allow the refrigerant to absorb and remove heat surrounding the evaporator 140 as the refrigerant is passed through coils in the evaporator 140. The evaporator 140, which may be an evaporator heat exchanger, may be disposed adjacent to an evaporator fan motor 144 configured to provide air flow across coils in the condenser 120. As the air of the enclosure passed over the coils of the evaporator 140, the air is cooled while the refrigerant in the evaporator 140 absorbs heat from the air. The refrigerant from the evaporator 140 is returned to the compressor 110 for compression.

The compressor 110 is one of the four components that requires electricity to function. It is also the largest consumer of electricity in the refrigeration circuit and in some cases, the electricity consumption may equate up to 90% of the total energy consumption. The compressor 110 is also the main component that can keep the refrigeration circuit from properly operating. When the compressor 110 fails, produce stored in a compartment cooled by the refrigeration circuit may be ruined. Such failure may cause the end user additional daily expenses. Thus, reliability of the compressor 110 is important to the end user. As an example, a customer storing produce in a retail commercial display relies on the compressor 110 to work reliably.

The compressor 110 can be controlled by a thermostat 190 configured to send an electrical trigger signal to the compressor 110 to start the compressor 110 and to stop the compressor 110 when a temperature set point is reached in the cabinet and the display. Stopping the compressor 110 stops the refrigerant from producing more cooling.

In a multi display refrigeration commercial system the thermostat may be configured to close a solenoid valve and stop the liquid flowing in the cabinet to stop the cooling being produced. However, in these systems the compressor 110 continues its operation at full speed and load to cool other cabinets on the circuit.

An air-conditioning system works very similar to the above described examples, however the system cools space (e.g., space around the evaporator 140) instead of cabinets or fridges. Some air-conditioning systems have multiple compressors 110 to increase cooling when needed (see FIG. 2 described below). In these systems, the compressors can be controlled by a thermostat in the area and sometimes controlled by pressure switches on the suction, low pressure pipe of the compressor 110. These systems work by using an enthalpy chart diagram of the refrigerant type used. When the low-pressure transducer senses the suction pressure, the controller assumes the temperature returning is cold, equating this to a satisfactory cooling in the cabinets.

As shown in FIG. 1, some systems may include one or more condenser fan motors 124 which can be set to come on either when the compressor is on or controlled by a pressure switch when the high side pressure exceeds the setpoint set by a technician on commissioning of the fan motors. Conventional systems can result in extra energy consumed with unneeded operation of the condenser fan motor 124, for example when the condenser fan motor 124 is operated based purely on the pressure on the high discharge pipe.

Air-conditioning system also include one or more condenser fan motors 124 operating similar to what has been described above. Air-conditioning system can include a large indoor evaporator fan that operates continuously on one speed until the air conditioner turns off. This is a typical configuration in commercial and industrial applications. In these systems there is a waste of energy consumption due to the continuous or intermittent operation of the components according to conventional methods.

In conventional systems, the energy consumption and waste described above have always been transferred to the consumer with the additional costs for operating the products.

Conventional control systems can also contribute to failure in the system components. For example, when air-conditioning and refrigeration systems are controlled by pressure, the temperature of the return suction gas is programmed into the system controller. This usually happens when the system is losing its refrigerant charge with a small leak that has developed. With a small leak of refrigerant in the air-conditioning or refrigeration circuit, the compressor 110 will slow down, due to the pressure sensor telling the system controller that everything is running efficiently and the inside temperature being nearly reached. However, the temperature on the suction is now returning warm if not hot and the compressor 110 is gradually wearing down the coil, bearings and oil. This can contribute to compressor 110 failures.

Example Implementation

Examples of the present technology save energy, save produce from spoiling and extend equipment life by providing a smart controller 150 configured to improve operation of a vapor-compression system.

Examples of the present technology provide a smart logic controller 150 configured to monitor all possible faults and flaws to protect the components of the system (e.g., compressor 110). The smart logic controller 150 may be configured to monitor the operating parameters of the compressor 110 to optimize energy efficiency. In some examples, a smart logic controller 150 may monitor and gather data of the compressor 110 by using thermal sensors installed on the suction gas pipe and the discharge gas pipe.

Examples of the present technology provide a smart logic controller 150 configured to maintain and monitor a plurality of compressors (e.g., if a second, third or more compressors are provided) on one circuit or multiple circuits by one or more additional sensors (e.g., a third thermal sensor).

Examples of the present technology provide a smart logic controller 150 configured to help with dehumidification of cooling spaces, by the modulation of an inverter-controlled lead compressor 110. The Slave devices compressors will come on via a trigger relay on the control logic when needed, this will be collecting data now from sensor 166, with a delta T measurement off the data collected from sensor 164.

Examples of the present technology provide a smart logic controller 150 configured to help with the peak demand charges, by soft starting a compressor 110.

Examples of the present technology provide a smart logic controller 150 configured to look out for short cycling of the now inverted compressor 110 by having a time delay re-start built in. This will eliminate the now inverted compressor 110 from overheating or working in a short cycle mode.

Examples of the present technology provide a smart logic controller configured to maintain a healthy oil return sequence to protect the compressor 110. This is built in and can be set up with a dip switch control on commissioning. This will eliminate the compressor 110 from running itself out of oil. A compressor 110 with inverter control can develop this fault, because if a compressor 110 runs for long periods of time on slow speed, the compressor 110 can eventually empty itself out of oil.

Examples of the present technology provide smart logic controller 150 configured to protect the compressor 110 from abnormal heat returning from the suction gas pipe when the compressor 110 is short of refrigerant.

According to examples of the present technology, a smart logic controller 150 cab be configured to operate in a plurality of different modes. As an example, when commissioning the smart logic controller 150 on a compressor mode, a temperature set point is programmed to control the compressor 110 operation. The compressor 110 can be controlled to speed up or slow down depending how close the temperature of the suction gas pipe is to the set point. If the set point is too far from the actual temperature (above a predetermined temperature difference of a set point of 14 Deg C. (57 F) of the suction gas pipe, the smart logic controller 150 can be configured to control the compressor 110 to speed up, to reach the set point faster. As soon as the temperature of the return comes closer 14 Deg C. (57 F) to the set point, the compressor 110 can be controlled to slow down and run more efficiently on lower speed where less energy is consumed. When the desired temperature (e.g., in the room or cabinet) is reached, the thermostat 190 of the system may send the smart logic controller 150 a signal to switch off the compressor into stand by. When the thermostat of the room or cabinet instructs the system to come on, the smart logic controller 150 is configured to start a new cycle as described above.

According to examples of the present technology, the smart logic controller can be configured to control operation of an evaporator fan motor 144, by changing the mode on the logic control board into evaporator mode. The evaporator mode may be used to save energy on the evaporator fan cycle, when the air handler of an air-conditioner is working, this is monitoring and reading the temperature of the room. In this mode, when the thermostat triggers the compressor 110 to start cooling, the evaporator fan motor 144 continues normal speed operation. This happens, for example, in every cinema theatre, large shopping malls and even smaller applications, where the evaporator fan motor 144 runs continuously (e.g., 24/7). The thermostat may only switch on or off the compressor 110, which is the main device that cools or heats the room or space area, while the evaporator fan motor 144 is a non-stop consumer working continuously (e.g., 24/7). To improve the efficiency, the smart logic controller 150 is configured to look at the supply temperature of the air handler or large air-conditioner and control the evaporator fan motor 144 based on the supply temperature. For example, the smart logic controller 150 may be configured to slow down the evaporator fan motor 144 when the air handler stops producing cooling. The reduction in the supply temperature corresponds to the shutdown of the compressor.

By slowing down the evaporator fan motor 144, the air temperature of the building is still circulated but at a slower pace. Slowing down the evaporator fan motor 144 will save the full consumption of running the evaporator fan motor 144 at full speed (e.g., 100%). As an example, controlling the evaporator fan motor 144 according to examples of the present technology can reduce the evaporator fan motor 144 operation from 100% to 70% on and off over a 24 hour period. With this energy saving method the control logic can easily save the customer another 30% of the fan motor energy consumption.

The smart controller 150 may be configured to operate based on signals received from one or more sensors. In one example, smart controller 150 may be configured to operate based on signals received from three sensors. A first sensor is configured to maintain and monitor the discharge temperature and Compressor/Motor temperature. A second sensor is configured to monitor the temperature of the suction return, for controlling the inverter speed depending the temperature return compared with the set point temperature. A third sensor is configured to monitor the second compressor or return air temperature depending on what application it is installed on to bring on the second compressor and third compressor when needed.

As shown in FIG. 1, the controller 150 is coupled to the compressor 110, condenser fan motor 124, the evaporator fan motor 144, and a plurality of sensors 162-166. The controller 150 is configured to control operation of the compressor 110, condenser fan motor 124, and/or the evaporator fan motor 144 based on one or more of the plurality of sensors 162-166.

The controller 150 may include circuitry 152 configured to perform one or more operations described herein. For example, the circuitry may be configured to control receive signals one or more of the plurality of sensors 162-166 and transmit control signals to the compressor 110, condenser fan motor 124, and/or the evaporator fan motor 144.

As shown in FIG. 1, the controller 150 may be coupled to the sensors 162-166. The sensors 162-166 may include internal and/or external sensors configured to measure a physical parameter of the system and/or the system's environment. The sensors 162-166 may provide a signal corresponding to the measured parameter to the controller 150. In some examples, one or more of the sensors 162-166 may include non-contact sensors.

The controller 150 may provide a smart logic controller for operating the compressor 110, condenser fan motor 124, and/or the evaporator fan motor 144 by taking into account the information received from the one or more sensors 162-166.

In the example illustrated in FIG. 1, a first sensor 162 may be disposed adjacent to the compressor 110. The first sensor 162 may be configured to provide signals corresponding to a discharge temperature and/or compressor motor temperature. A second sensor 164 and/or a third sensor 166 may be disposed along the refrigerant circuit between the compressor 110 and the evaporator 140. The second sensor 164 may be configured to provide signals corresponding to the temperature of the suction return. The third sensor 166 may be configured to provide signals corresponding to the return air temperature. In some examples of the present technology, the first sensor 162 is purely to monitor and measure the temperature of discharge Head of the compressor 110 when in comp mode or the outer casing of fan motor 144 when in evap mode. The second sensor 164 is a data collecting sensor that controls the speed of the compressor 110 or the fan motor 144 when set to a set point temperature on the smart logic controller 150, the third sensor 166 collects data on the suction pipe on comp mode or supply temp on the evap mode to bring in other compressors or fan motors when and if needed.

The circuitry 152 may include one or more processors, a dedicated electronic circuit, an application-specific integrated circuit, discrete electronic components (e.g., digital and/or analog), programmable logic controller, and/or memory. The circuitry 152 may be configured to receive input signal(s) (e.g., from a sensor, an input device, and/or an external device) and provide output signals (e.g., to the compressor 110, condenser fan motor 124, the evaporator fan motor 144, and/or an external device).

As shown in FIG. 1, the controller 150 may include one or more output devices 154, one or more communication interfaces 156, and/or one or more input devices 158. One or more of the output device 154, the communication interface 156, and/or the input device 158 may be provided external to the controller 150. The output device 154 may include a display and/or a speaker configured to provide visual and/or audio output. The input device 158 may include buttons, switches or dials allowing a user to interact with the controller. The buttons, switches or dials may be physical devices, or software devices accessible via a touch screen. The communication interface 156 may be configured to communicate with an external device (e.g., a remove device and/or a local device) over a wireless and/or wired connection. The communication interface 156 may transmit and/or receive digital and/or analog signals.

In some examples of the present technology, the smart logic controller 150 includes an LCD display that shows the temperatures and time log of the compressor's or fan motor running time, to allow the technician or user to understand the behavior of the compressor 110 or one or more motors (e.g., an evaporator fan motor 144). In some examples of the present technology, the LCD display may be included in the output device 154.

As shown in FIG. 1, a thermostat 190 may be coupled to the controller 150. The thermostat 190 may be coupled directly or via the communication interface 156 to the circuitry 152. The thermostat 190 may include an analog, programmable and/or a smart thermostat. The thermostat 190 may be configured to control operation of the compressor 110.

As shown in FIG. 1, the controller 150 may be provided as an intermediate component between the vapor-compression system and the thermostat 190. The controller 150 may receive control signals from the thermostat 190 and transmit the received control signals to the compressor 110, condenser fan motor 124, and/or the evaporator fan motor 144 with or without modification based on signals received from one or more sensors 162-166. Modifying the control signals may include interrupting a control signal, modifying the value (e.g., voltage) of a control signal, and/or providing a new control signal. Providing the controller as an intermediate component may allow the controller 150 to be added to existing systems without significant cost and/or having to remove existing components.

In some examples of the present technology, the thermostat 190 may be integrated into the controller 150.

In some examples of the present technology, the compressor 110 may be a variable speed drive compressor. As shown in FIG. 1, the controller 150 may be coupled to the compressor 110 via an inverter driver 115 to provide variable speed drive compressor control. The inverter driver 115 may receive an input voltage (e.g., 115 or 230 Voltage AC) and output three phases for controlling the compressor 110 based on signals received from the controller 150. The inverter driver 115, which may include a variable frequency drive, may be configures to adjust the frequency of each phase below or above average values (e.g., 50/60 HZ used in a power grid). The output of the inverter driver 115 may set the speed of the compressor 110, which corresponds to the cooling to be provided by the system. The speed of the compressor 110 may be determined based on information received from one or more sensors 162-166 and/or the thermostat 190.

Figure 2:
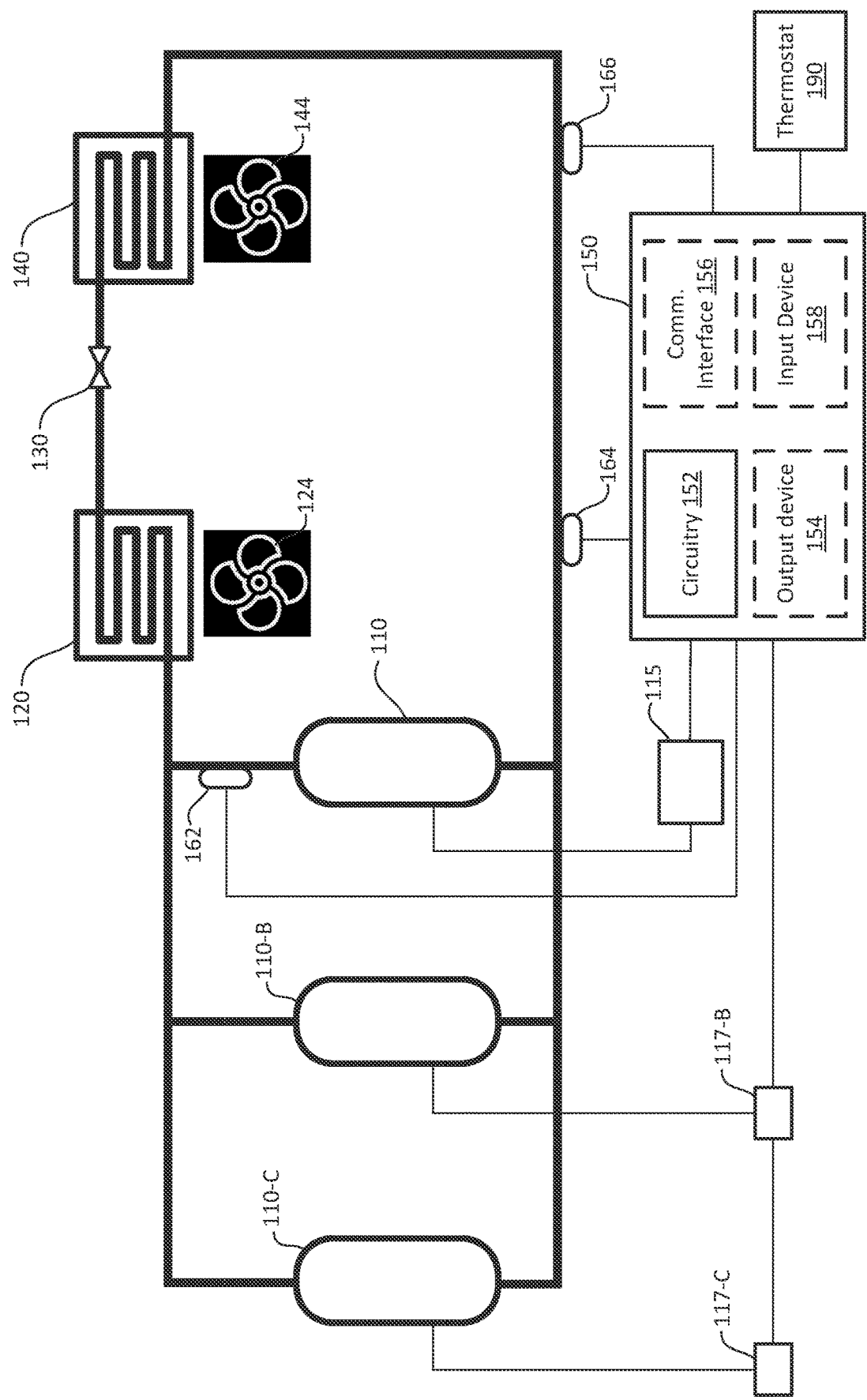
FIG. 2 illustrates a system including a plurality of compressors according to an embodiment of the present technology.

FIG. 2 illustrates a system including a plurality of compressors according to an embodiment of the present technology. Components of the system illustrated in FIG. 2 may correspond to components having the same reference number show and described with reference to FIG. 1.

As show in FIG. 2, a second compressor 110-B and a third compressor 110-C are provided in parallel to the compressor 110. The controller 150 may be configured to control operation of the second compressor 110-B and/or the third compressor 110-C based on signals received from one or more of the plurality of sensors 162-166. The controller 150 may be configured to turn on and off the second compressor 110-B by controlling a first switching device 117-B and to turn on and off the third compressor 110-C by controlling a second switching device 117-C. The first switching device 117-B and/or the second switching device 117-C may comprise a relay. The first switching device 117-B and/or the second switching device 117-C may be provided as part of the controller 150 according to some embodiments of the present disclosure.

In the system illustrated in FIG. 2, the controller may control the compressor 110 to turn on when an on signal is received from the thermostat 190. After turning on the compressor 110, the controller 150 may be configured to control the second compressor 110-B and/or the third compressor 110-C to turn on based on the signals received from the third sensor 166 on the air return and the second sensor 164 with the suction return in a timely frame.

The second compressor 110-B and/or the third compressor 110-C may be controlled with a fixed speed or they can be fitted with a second and third intelligent control including a respective inverter driver to provide a variable speed compressor. These decisions can be made depending on the system requirements and/or customer's cost constraints. In the example illustrated in FIG. 2, the compressor 110 may function as a master inverter compressor and the second and third compressors 110-B and 110-C functioning as slave compressors.

As will be discussed in more detail below, the controller 150 may be configured to start operating one or more slave compressor when temperature on the suction does not decrease or stays the same during a predetermined time period.

The controller can also maintain the humidity by delaying the second and third compressor from coming in, so the system will assure the full compressors capacity to be used. This is another energy saving mode for the customer built in invention is the humidity control avoiding short cycling of second or third compressors, and maintaining an only needed cooling capacity to be produced, over cooling does increase humidity in space areas, so the third sensor 166 monitors this temperature to avoid over cooling and avoid increase humidity production.

While two slave compressors are illustrated in FIG. 2, examples of the present technology are not so limited and may include a single slave compressor or more than two slave compressors.

Figure 3:
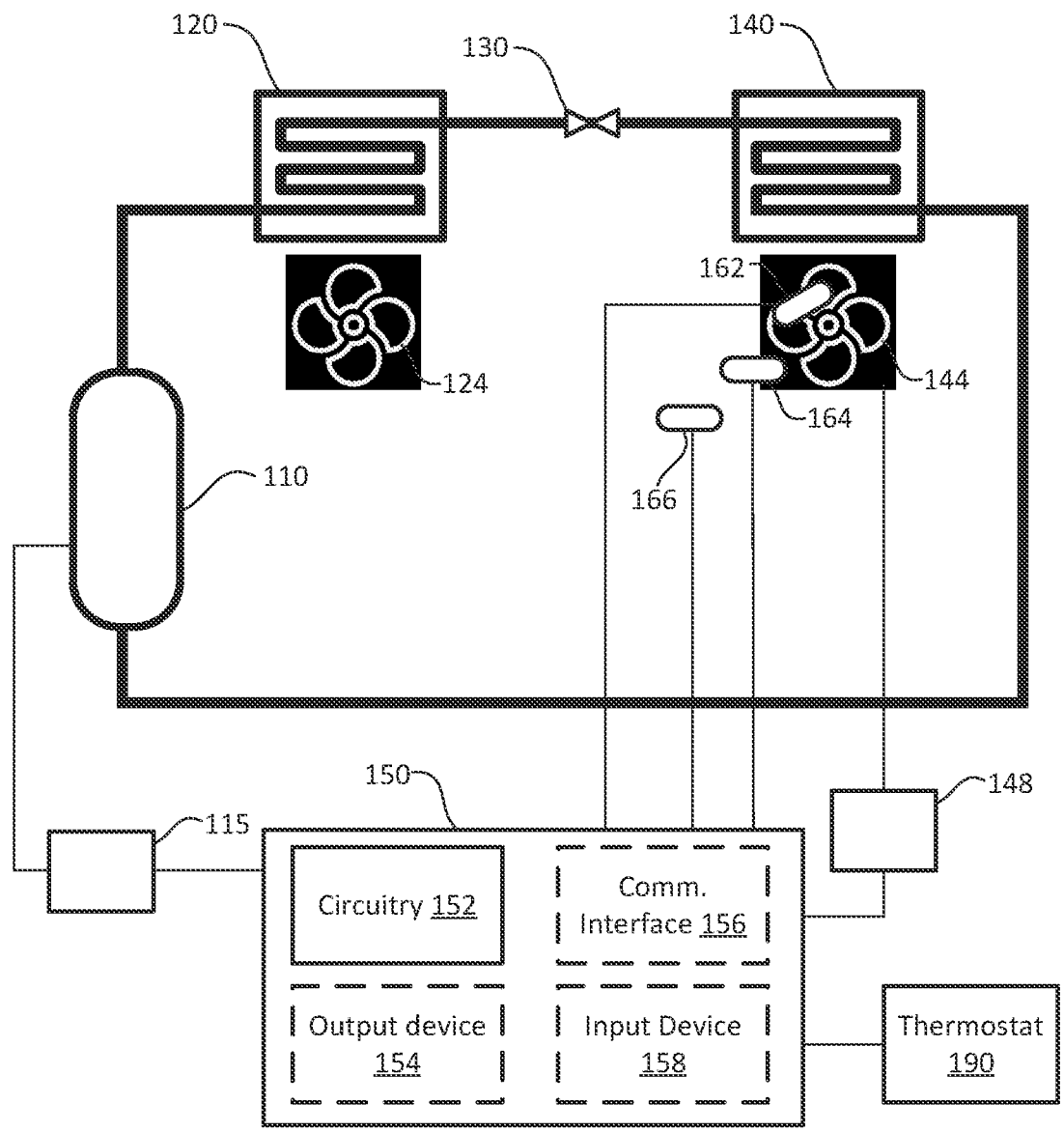
FIG. 3 illustrates a system for performing an evaporation mode according to an embodiment of the present technology.

FIG. 3 illustrates a system for performing an evaporation mode according to an embodiment of the present technology. Components of the system illustrated in FIG. 3 may correspond to components having the same reference number show and described with reference to FIG. 1.

In the system illustrated in FIG. 3, a first sensor 162 is placed on casing of the evaporator fan motor 144 to sense the temperature of the motor winding temperature, a second sensor 164 is placed on the air supply duct to sense the cooling coming off the coils of the evaporator 140, and third sensor (e.g., sensor 166) is placed on the return when there is more than one fan motor in the system. The plurality of sensors 162 and 164 may be coupled to the controller 150 and provide the controller of temperature measurements.

In the system illustrated in FIG. 3, the controller 150 is coupled to the evaporator 140 via an inverter driver 148. Controlling the evaporator fan motor 144 via the inverter driver 148 may provide variable speed evaporator fan motor control. The controller 150 may be configured to control the evaporator fan motor 144, to work in high speed when the compressor 110 is turned ON and slow down the evaporator fan motor 144 when the compressor 110 is switched OFF. The compressor 110 may be turned on based on a signal received from the thermostat 190 directly or via the controller 150.

Figure 4:
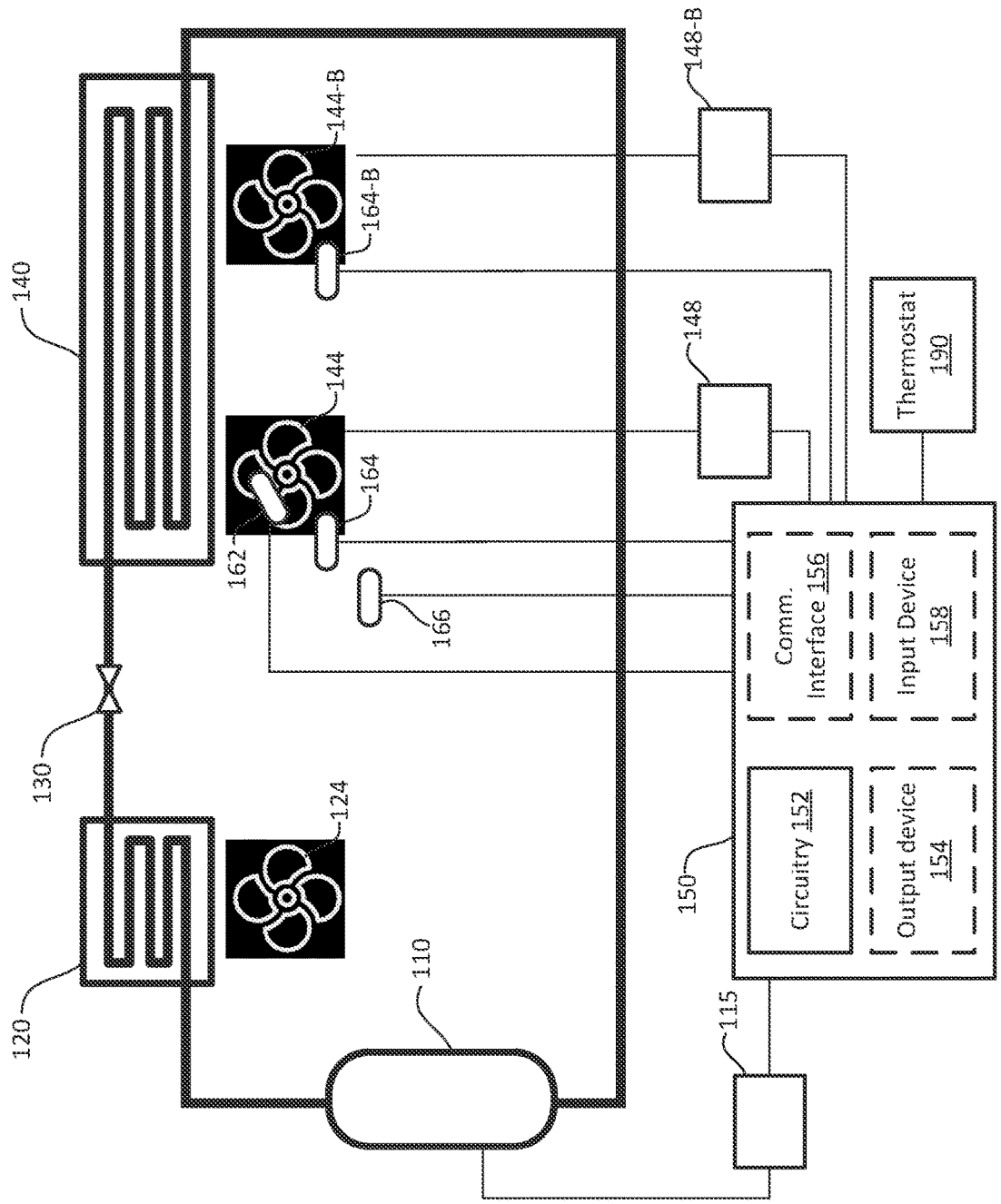
FIG. 4 illustrates a system for performing an evaporation mode in which a plurality of evaporator fan motors are included according to an embodiment of the present technology.

FIG. 4 illustrates a system for performing an evaporation mode in which a plurality of evaporator fan motors are included according to an embodiment of the present technology. Components of the system illustrated in FIG. 4 may correspond to components having the same reference number show and described with reference to FIG. 1 and/or FIG. 3.

As shown in FIG. 4, a first evaporator fan motor 144 and a second evaporator fan motor 144-B are included in the system adjacent to the same evaporator 140. In some examples of the present technology, the first evaporator fan motor 144 and a second evaporator fan motor 144-B may be provided adjacent to different evaporators of the same system.

As discussed in more detail below, the controller 150 may be configured to turn on the first evaporator fan motor 144 when the compressor 110 is determined to be operating and reduce the operating speed of the first evaporator fan motor 144 when the compressor 110 is determined to be not operating. During the full operation of the first evaporator fan motor 144, the controller 150 may perform a countdown after the first evaporator fan motor 144 is started, to determine if the temperature during the countdown did not decrease. If the temperature is determined to not decrease during the countdown, the second evaporator fan motor 144-B may be turned on. Determining whether the temperature decrease is present during the countdown may be based on signals received from sensors 162, 162-B and/or 164. When the temperature gets closer to set point, the controller 150 may control the inverter driver 148 and/or inverter driver 148-B to start modulation of the first evaporator fan motor 144 and/or the second evaporator fan motor 144-B, respectively. In some examples of the present technology, the second evaporator fan motor 144-B may be controlled without an inverter driver 148-B.

While only two evaporator fan motors are illustrated in FIG. 4, one or more additional evaporator fan motor may be included in the system illustrated in FIG. 4 with corresponding sensors and/or inverter drivers.

FIGS. 1-4 can all be connected and operation either all in one circuit or separately. For example, the controller 150 may be configured to control operation of one or more compressors based on the description provided with reference to FIGS. 1 and 2 and control one or more evaporator fan motors based on the description provided with reference to FIGS. 3 and 4.

The intelligent controller 150 is designed to work independently or jointly. The intelligent controller 150 is universal design, designed to fit all compressors and fan motors. In some examples, the controller 150 is universal design, designed to fit all compressors and fan motors operating at 3 phases and any voltage.

Figure 5:
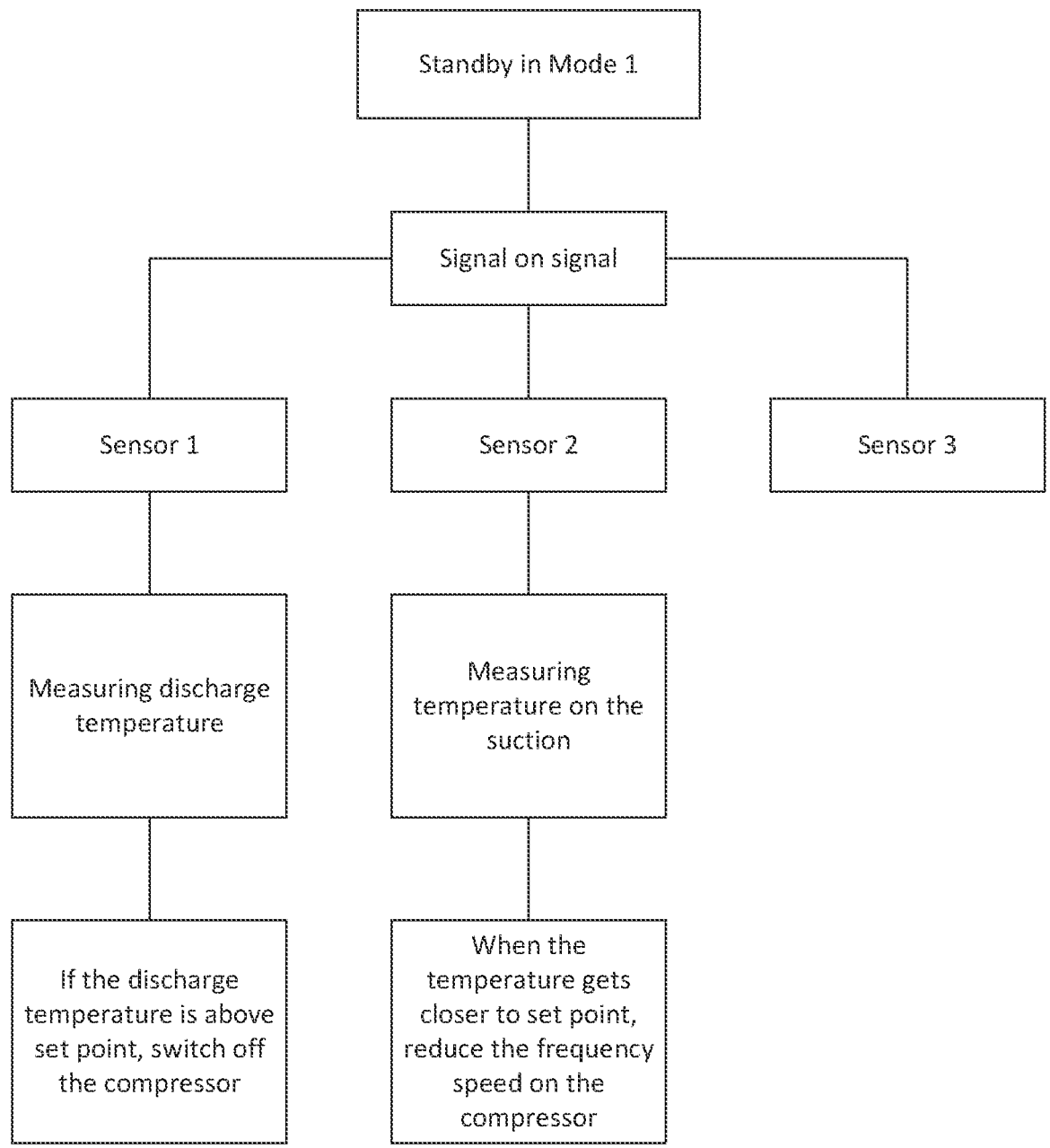
FIG. 5 illustrates operations of a compressor mode of the system illustrated in FIG. 1 according to an embodiment of the present technology.
Figure 6:
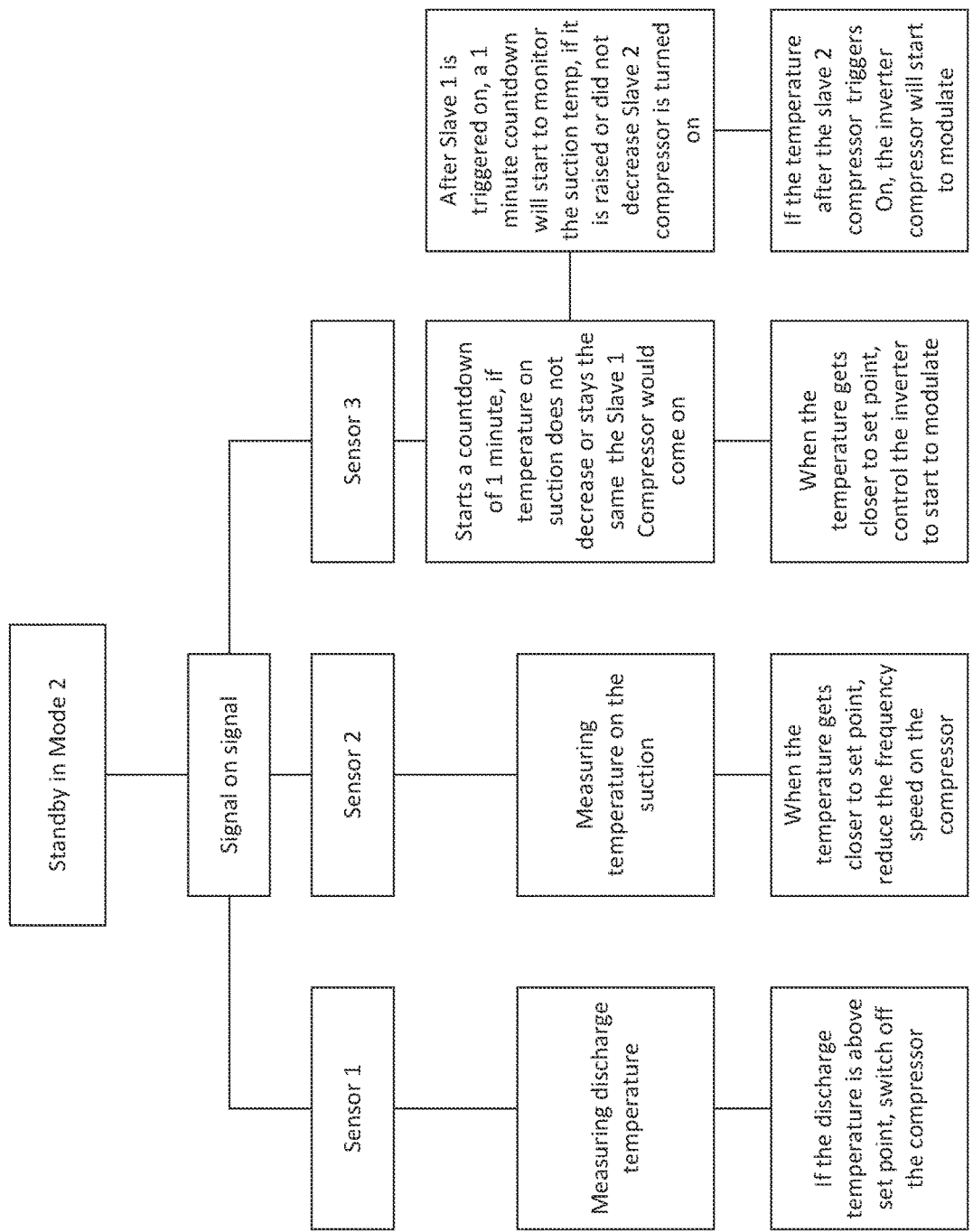
FIG. 6 illustrates operations of a compressor mode of the system illustrated in FIG. 2 according to an embodiment of the present technology.
Figure 7:
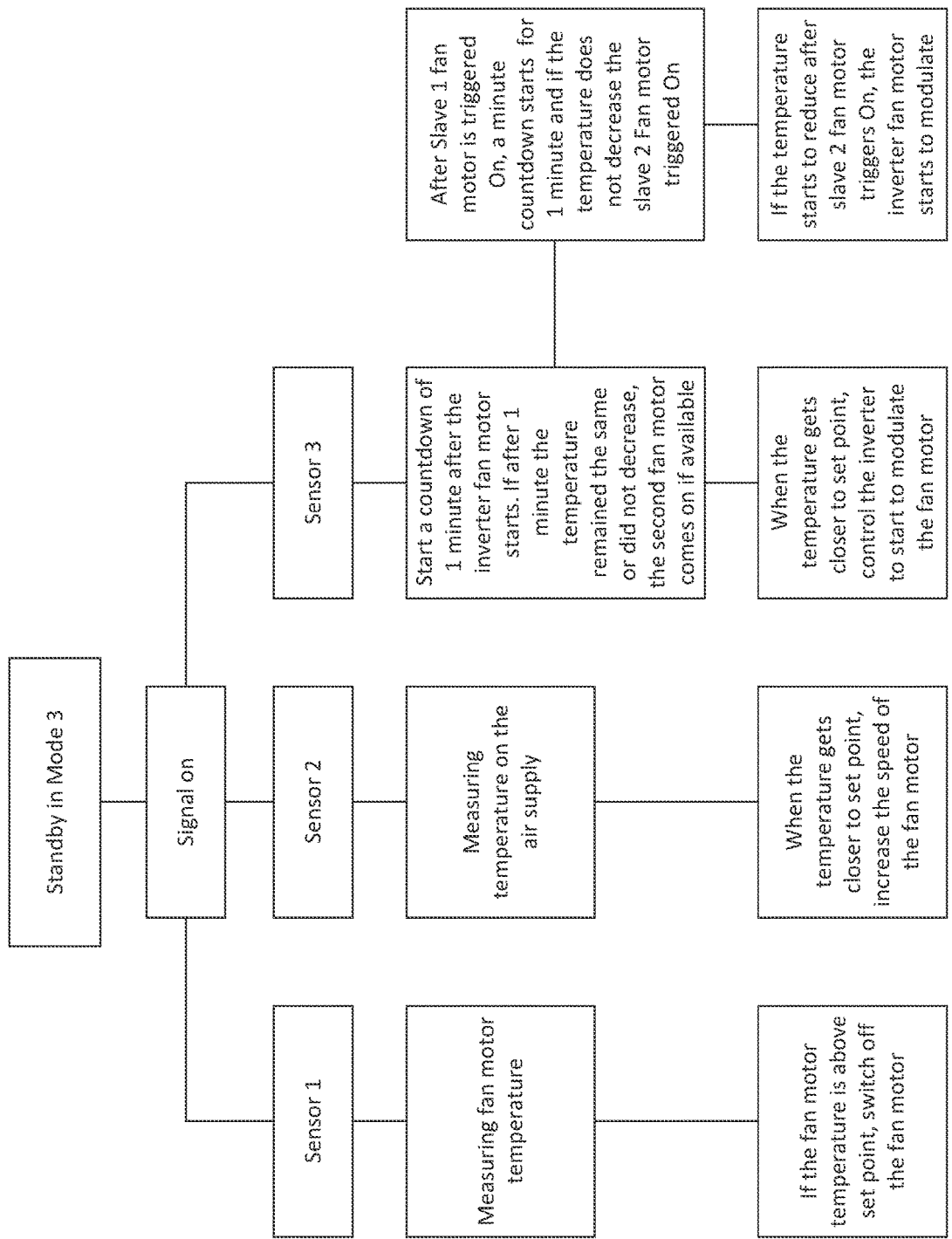
FIG. 7 illustrates operations of an evaporation mode of the system illustrated in FIGS. 3 and/or 4 according to an embodiment of the present technology.

The controller 150 may be configured to operate the vapor-compression system in a plurality of different operating modes. The plurality of different operating modes includes a first mode including compressor control with a single compressor on the circuit (shown in FIG. 5), a second mode including compressor control with two other compressors on a slave mode (shown in FIG. 6), and a third mode including an evaporator fan motor control mode (shown in FIG. 7). The details of the operational sequence in FIGS. 5-7 are shown as synchronous control logic in three different set up and modes.

Compressor Mode with Single Compressor

In the compressor mode including a single compressor 110 (e.g., see system shown in FIG. 1), the controller 150 may be configured to start the compressor 110 via the inverter driver 115 when the thermostat 190 (e.g., of the refrigerator or air-conditioner) triggers the compressor to come on (step 410). When the inverter compressor 110 is started, the controller 150 may monitor the suction temperature based on the signal received from the second sensor 164. The controller 150 may increase or decrease the speed of the compressor 110 as needed based on the second sensor signal. For example, the controller 150 may reduce the speed of the compressor 110 when the temperature corresponding to the second sensor signal gets closer to the set point. In some examples, the controller 150 may increase the speed of the compressor 110 when the temperature corresponding to the second sensor signal gets further away from the set point.

The controller 150 may monitor the discharge temperature of the compressor 110 based on the signals received from the first sensor 162. Monitoring and controlling the compressor 110 based on the discharge temperature may maintain a healthy discharge temperature output of the compressor 110. The controller 150 may be configured to switch off the compressor 110 when the discharge temperature is above the set point.

In some examples, the third sensor 166 may not be used when a single compressor 110 is used in the compressor mode.

Compressor Mode with More than One Compressor

In the compressor mode including more than one compressor 110 (e.g., see system shown in FIG. 2), operations similar to the example discussed above with the single compressor 110 may be performed by the controller 150 based on signals received from the first sensor 162 and the second sensor 164. Operations for the compressor mode including more than one compressor are shown in FIG. 6.

While the controller 150 controls operation of the compressor 110 based on the signals received from the first sensor 162 and the second sensor 164, the controller 150 may monitor suction pipe temperature based on the signal received from the third sensor 166. Variations in the suction pipe temperature may be monitored for a preset time period (e.g., 1 to 5 minutes, 1 to 3 minutes, or 1 minute). If the suction pipe temperature does not change or decrease during the preset time period, the control logic may start operation of another compressor (e.g., the second compressor 110-B). The preset time period may be implemented with the controller 150 providing a countdown from the preset time period that is started from a predetermined condition is satisfied (e.g., when the compressor 110 is started). In some examples, the countdown may be implemented by the third sensor 166.

After starting the other compressor, a countdown may be started again and a determination made if the suction temperature (after the other compressor is started) is raised or not, while controlling and maintaining the speed of the compressor 110 and second compressor 110-B based on signals received from the second sensor 164. After the subsequent countdown (e.g., which may be the same to or different to the first countdown) has finished, the controller 150 is configured to bring on another compressor (e.g., a third compressor 110-C) if the suction temperature did not decrease. As soon as the suction temperature start to decrease (after the first countdown or the second countdown), the inverter compressor starts to modulate better due to saved energy and maintains healthy operation. At this point, the controller 150 continues to monitor the suction temperature based on the signal received from the third sensor 166 and makes a determination as to whether to leave on or switch off the third compressor 110-C based on the suction temperature. This sequence of events may continue until the inside thermostat temperature is reached and the thermostat 190 triggers the controller to switch off all compressors. After turning off the compressors, the controller may go into standby and wait for the next sequence trigger to start again.

Evaporator Mode

The evaporator mode shown in FIG. 7 is provided to reduce the energy consumption due to operation of the evaporator fan motor 144. The evaporator fan motor 144 normally runs when the system (e.g., air-conditioning) is started till the system is switched off. The evaporator fan motor 144 does not run on a control signal from a thermostat 190 like the compressors.

To improve the efficiency, the evaporator fan motor 144 is slowed down when the cooling process by the compressor 110 has been triggered to turn off by the thermostat 190 due to the temperature in the room having been achieved. In most large applications, evaporator fan motor 144 does not need to keep on running at full speed if the temperature has been achieved in the room, so this is where the controller 150 can help customers save energy on unneeded fan motors to run.

With reference to FIGS. 3 and 7, when the system (e.g., air-conditioning system) is switched on, it will trigger the controller 150 to turn on the evaporator fan motor 144 with an inverter driver 148. The controller 150 may soft start the evaporator fan motor 144 and run the evaporator fan motor 144 into high speed. In this operating mode, the second sensor 164 is placed on the air supply duct to sense the cooling coming off the coils of the evaporator 140. The first sensor 162 is configured to sense the temperature of the motor winding in the evaporator fan motor 144. The first sensor 162 may be placed on a casing of the evaporator fan motor 144 to sense the temperature of the motor winding temperature. A third sensor 166 is placed on the return when there is more than one fan motor in the system. The operation speed of the evaporator fan motor 144 may be controlled based on one or more of the sensors 164 and 166.

In one example, the second sensor 164 is set to its set point temperature on commissioning and when the temperature gets warmer, the fan motor slows down. Accordingly, the controller 150 may be configured to receive a signal from the second sensor 164 representing a temperature in the air supply duct and reduce the speed of the evaporator fan motor 144 when the temperature in the air supply exceed the set point temperature. This is based on the assumption that if the temperature on the air supply duct is warming up, the cooling is satisfied in the room and the compressor has switched off. At this point there is no need for further cooling. However, because the fan motor never switches off, the controller 150 is configured to only slow down the evaporator fan motor 144 until the cooling is needed again. If the controller 150 determines based on the signal received from the second sensor 164 that the supply air temperature has started to decrease again, the evaporator fan motor 144 may be controlled to speed up (e.g., to full speed) because the room is asking for cooling. As shown in FIG. 7, the fan motor speed may be increased when the temperature gets closer to the set point. This sequence of operations may continue until the system is completely switched off. We can see that this sequence and mode can easily save the customer another 20% to 30% of fan motor energy consumption.

As shown in FIG. 7, the first sensor 162 may measure fan motor temperature and switch off the fan motor if the fan motor temperature is above a set point. The fan motor temperature may indicate that cooling due to a stop in operation of the compressor 110 is no longer being performed and the speed of the evaporator fan motor 144 may be decreased.

In examples of the present technology with more than one fan motor in the system (e.g., system shown in FIG. 4), an additional sensor (e.g., sensor 164-B) may be provided for each additional evaporator fan motor and/or a third sensor 166 on the air return may be provided. In this example, a countdown of a preset time (e.g., 1 to 5 minutes, 1 to 3 minutes, or 1 minute) may be started after the evaporator fan motor 144 is started via the inverter driver 148 (see FIG. 7). Variations in the temperature measured by the third sensor 166 or an additional sensor (e.g., sensor 164 or sensor 164-B) may be monitored for the preset time. If the temperature measured by the third sensor or additional sensor (e.g., sensor 164 or sensor 164-B) remains the same or does not decrease during the countdown, a first slave evaporator fan motor 144-B is controlled to be turned on. When the temperature gets closer to a set point, the controller 150 is configured to start to modulate the first slave evaporator fan motor 144-B. The preset time period may be implemented with the controller 150 providing a countdown from the preset time period that is started from a predetermined condition (e.g., when the compressor 110 or evaporator fan motor 144 is started). In some examples, the countdown may be implemented by the third sensor (not shown in FIG. 3).

After starting the first slave evaporator fan motor 144-B, a countdown may be started again and a determination made if the temperature measured by the third sensor 166 or another sensor (e.g., sensor 164-B or a sensor associated with a second slave evaporator fan motor) remains the same or does not decrease during the countdown during the countdown. If the temperature starts to reduce after the second slave evaporator fan motor is turned on, the controller 150 may cause the inverter fan motor to start to modulate.

While the above discussion provides for an additional sensor to be included with each additional slave evaporator fan motor, embodiments of the present technology may be implemented by controlling additional slave evaporator fan motors based on temperature measurements made by the first sensor 164 and/or the second sensor 166.

It will be appreciated that as used herein, the terms system, subsystem, service, processor, programmed logic circuitry, and the like may be implemented as any suitable combination of software, hardware, firmware, and/or the like. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vapor compression refrigeration system, comprising:
    a variable speed drive compressor configured to suction refrigerant and discharge refrigerant;
    a first sensor configured to measure refrigerant discharge temperature from the variable speed drive compressor;
    a second sensor configured to measure refrigerant temperature on a suction return of the variable speed drive compressor;
    a first slave compressor; and
    a controller including circuitry coupled to the first sensor, the second sensor and the variable speed drive compressor, wherein the controller is configured to:
        during operation of the variable speed drive compressor, receive a first signal corresponding to the refrigerant discharge temperature from the first sensor and a second signal corresponding to the refrigerant temperature on the suction return to the variable speed drive compressor from the second sensor;
        start a countdown set to a predetermined time period in response to the variable speed drive compressor being turned on;
        control the first slave compressor to turn on in response to the refrigerant temperature on the suction return not decreasing during the countdown; and
        based on the first signal from the first sensor and the second signal from the second sensor, adjust modulation speed of the variable speed drive compressor, wherein controlling the modulation speed of the variable speed drive compressor includes:
  based on the second signal from the second sensor indicating that the refrigerant temperature on the suction return to the variable speed drive compressor is above a set point and in a first area relative to the set point, control the variable speed drive compressor to increase frequency speed of the variable speed drive compressor; and
  based on the second signal from the second sensor indicating, after the variable speed drive compressor is controlled to increase frequency speed of the variable speed drive compressor, that the refrigerant temperature on the suction return to the variable speed drive compressor is above the set point and in another area relative to the set point, control the variable speed drive compressor to decrease the frequency speed of the variable speed drive compressor.

2. The vapor compression refrigeration system of claim 1, wherein the controller is configured so that the variable speed drive compressor is controlled to soft start.

3. The vapor compression refrigeration system of claim 1, wherein based on the first signal indicating that the refrigerant discharge temperature is above a set point, the controller is configured so that the variable speed drive compressor is controlled to turn off if the first signal indicates that the refrigerant discharge temperature is above the set point for at least a predetermined time period.

4. The vapor compression refrigeration system of claim 1, further comprising a condenser and an evaporator fan motor configured to provide air flow across coils in the condenser and wherein the controller is further configured to:
  control a speed of the evaporator fan motor based on a temperature of a winding of the evaporator fan motor.

5. The vapor compression refrigeration system of claim 1, further comprising a second slave compressor and wherein the controller is further configured to:
  start a second countdown set to the predetermined time period when the first slave compressor is turned on; and
  control the second slave compressor to turn on in response to the refrigerant temperature on the suction return not decreasing during the second countdown.

6. The vapor compression refrigeration system of claim 5, wherein the controller is configured to control the variable speed drive compressor to start modulation when the first slave compressor and/or the second slave compressor are started.

7. The vapor compression refrigeration system of claim 5, wherein the first and second slave compressors are fixed speed compressors.

8. The vapor compression refrigeration system of claim 1, wherein the controller is configured to control the variable speed drive compressor via an inverter driver.

9. The vapor compression refrigeration system of claim 8, wherein the inverter driver is configured to receive an input voltage and output three phases for controlling the variable speed drive compressor based on signals received from the controller.

10. The vapor compression refrigeration system of claim 1, further comprising a third sensor configured to provide signals corresponding to return air temperature, and a second slave compressor, wherein the controller is further configured to: control the first slave compressor and the second slave compressor based on signals provided by the third sensor.

11. The vapor compression refrigeration system of claim 1, further comprising a third sensor configured to provide signals corresponding to return air temperature, and a second slave compressor, wherein the controller is further configured to:
  control the first slave compressor to turn on in response to the refrigerant temperature on the suction return not decreasing during the countdown and based on the return air temperature;
  start a second countdown set to a second predetermined time period when the first slave compressor is turned on; and
  control the second slave compressor to turn on in response to the refrigerant temperature on the suction return not decreasing during the second countdown and based on the return air temperature, wherein the predetermined time period is different from the second predetermined time period.

12. A method of controlling a compressor in a vapor compression refrigeration system, the method comprising:
  having a variable speed drive compressor configured to suction refrigerant and discharge refrigerant, a first sensor configured to measure refrigerant discharge temperature from the variable speed drive compressor, a second sensor configured to measure refrigerant temperature on a suction return of the variable speed drive compressor, and a first slave compressor;
  during operation of the variable speed drive compressor, receiving a first signal corresponding to the refrigerant discharge temperature from the first sensor and a second signal corresponding to the refrigerant temperature regarding the suction return to the compressor from the second sensor;
  starting a countdown set to a predetermined time period in response to the variable speed drive compressor being turned on;
  controlling the first slave compressor to turn on in response to the refrigerant temperature on the suction return not decreasing during the countdown; and
  based on the first signal from the first sensor and the second signal from the second sensor, adjusting modulation speed of the variable speed drive compressor, wherein controlling the modulation speed of the variable speed drive compressor includes:
    based on the second signal from the second sensor indicating that the refrigerant temperature on the suction return of the variable speed drive compressor is above a set point and in a first area relative to the set point, increasing frequency speed of the variable speed drive compressor; and
    based on the second signal from the second sensor indicating, after the variable speed drive compressor is controlled to increase frequency speed of the variable speed drive compressor, that the refrigerant temperature on the suction return of the variable speed drive compressor is above the set point and in another area relative to the set point, decreasing the frequency speed of the variable speed compressor.

13. The method of claim 12, wherein the vapor compression refrigeration system further comprising a third sensor configured to provide signals corresponding to return air temperature, and a second slave compressor, wherein the method further comprises:
  controlling the first slave compressor to turn on in response to the refrigerant temperature on the suction return not decreasing during the countdown and based on the return air temperature;

starting a second countdown set to a second predetermined time period when the first slave compressor is turned on; and controlling the second slave compressor to turn on in response to the refrigerant temperature on the suction return not decreasing during the second countdown and based on the return air temperature, wherein the predetermined time period is different from the second predetermined time period.

* * * * *